(12) United States Patent
Kang et al.

(10) Patent No.: US 6,913,397 B2
(45) Date of Patent: Jul. 5, 2005

(54) METHOD AND SYSTEM FOR INSERTION OF FIBERS OF A FIBER CABLE INTO A FERRULE

(75) Inventors: Keith Kang, Hollis, NH (US); Misu Kang, Hollis, NH (US); Robert Otto, Amherst, NH (US)

(73) Assignee: Xanoptix, Inc., Merrimack, NH (US)

( * ) Notice: Subject to any disclaimer, the term of this patent is extended or adjusted under 35 U.S.C. 154(b) by 101 days.

(21) Appl. No.: 10/463,294

(22) Filed: Jun. 17, 2003

(65) Prior Publication Data

US 2004/0042733 A1 Mar. 4, 2004

Related U.S. Application Data

(63) Continuation-in-part of application No. 10/090,880, filed on Mar. 4, 2002, now Pat. No. 6,604,866.
(60) Provisional application No. 60/399,807, filed on Jul. 31, 2002.

(30) Foreign Application Priority Data

Mar. 3, 2003 (US) .................................. PCT/US03/06322

(51) Int. Cl.[7] ................................................ G02B 6/36
(52) U.S. Cl. ........................................ 385/78; 29/564.2
(58) Field of Search ............................... 385/78, 83, 86; 29/34 D, 563, 564.2, 741

(56) References Cited

U.S. PATENT DOCUMENTS

| | | | | | |
|---|---|---|---|---|---|
| 5,214,730 A | * | 5/1993 | Nagasawa et al. | ............ | 385/59 |
| 5,377,286 A | * | 12/1994 | Iida et al. | ...................... | 385/33 |
| 5,394,495 A | * | 2/1995 | Booth et al. | ................... | 385/59 |
| 5,416,868 A | * | 5/1995 | Kakii et al. | .................... | 385/80 |
| 5,446,815 A | | 8/1995 | Ota et al. | ...................... | 385/33 |
| 5,550,942 A | | 8/1996 | Sheem | ........................ | 385/53 |
| 5,743,785 A | * | 4/1998 | Lundberg et al. | ............. | 451/28 |
| 5,815,621 A | | 9/1998 | Sakai et al. | .................... | 385/80 |
| 6,238,100 B1 | | 5/2001 | Sasaki et al. | ............ | 198/468.6 |
| 6,470,123 B1 | * | 10/2002 | Sherman et al. | ............ | 385/115 |
| 6,496,624 B1 | | 12/2002 | Hikita et al. | .................. | 385/50 |
| 6,719,927 B2 | * | 4/2004 | Sakurai et al. | ............. | 264/1.25 |

* cited by examiner

Primary Examiner—Tulsidas C. Patel
(74) Attorney, Agent, or Firm—Morgan & Finnegan, LLP

(57) ABSTRACT

A system and method for insertion of fibers into respective rows of fiber holes in a ferrule that involves mounting the ferrule in a first element and a proximal end of a first cable containing exposed fibers onto a movable element, adjusting the movable element until the fibers are adjacent to a bottom-most row of fiber holes, inserting each fiber into its respective hole in the bottom-most row, mounting the first cable in a second element, releasing the first cable from the movable element, mounting a second cable containing exposed fibers onto the movable element, adjusting the movable element until the fibers are adjacent to a second row of ferrule fiber holes, and inserting each fiber into its respective hole in the second row.

11 Claims, 29 Drawing Sheets

(24 of 29 Drawing Sheet(s) Filed in Color)

METHOD AND SYSTEM FOR INSERTION OF FIBERS OF A FIBER CABLE INTO A FERRULE

CROSS REFERENCE TO RELATED APPLICATIONS

This application claims priority under 35 USC 119(e)(1) of U.S. Provisional Patent Application Ser. No. 60/399,807, filed Jul. 31, 2002 and is a continuation-in-part of U.S. patent application Ser. No. 10/090,880 filed Mar. 4, 2002 now U.S. Pat. No. 6,604,866, the entirety of which is incorporated herein by reference, and also claims priority under 35 USC §119, on PCT/US03/06322.

FIELD OF THE INVENTION

This invention relates to optical fiber connector assemblies and, more particularly, to an improved method and system for insertion of fibers into a ferrule of an optical fiber connector.

BACKGROUND

Commercial optical fiber connector assemblies ("connector assemblies") are used to couple optical fibers together so that light transiting from a bundle of one or more fibers in one end of the connector assembly will pass through the connector assembly to fibers or a device connected to the other end of the connector assembly. Such connector assemblies typically include a ferrule through which the optical fiber(s) is inserted before assembly of the ferrule and optical fiber(s) within the connector assembly. The ferrule holds the fiber(s) in a precise position and ensures that when the connector assembly is attached to a mating connector assembly or some other device, the fiber(s) of the connector assembly are held in consistent alignment.

Many applications today require connector assemblies containing multiple fibers ("multi-fiber connector assemblies"). Many commercially available multi-fiber connector assemblies today—such as that shown in U.S. Pat. No. 5,214,730—provide connections for fiber arrays of between 2 and 12 fibers arranged in a single row (although some commercial 2×12 configurations are available). In addition, other types of commercial connectors for small arrays of fibers (i.e., less than 12) are available or have been proposed, for example, as shown in U.S. Pat. No. 5,743,785.

These multi-fiber connector assemblies typically use a common type of ferrule commercially available from, among others, US CONEC LTD. and ALCOA FUJIKURA LTD. These ferrules are generally quite small in size, on the order of about 2 mm (2,000 microns) high, 6 mm (6,000 microns) wide and 8 mm (8,000 microns) deep, and have a face portion of at least 3 mm (3,000 microns) thick to support and hold the optical fibers. These ferrules typically contain an array of fiber holes (generally linear or rectangular), each sized to accept a single optical fiber, spaced apart from one another by a center-to-center distance ("pitch") of approximately 250 microns (± a few microns of manufacturing tolerance).

To facilitate insertion of the individual fibers into the fiber holes, these ferrules typically include a guide groove or internal guiding structure for each fiber hole. These guide grooves are typically about 1.5 mm (1,500 microns) long, although they can be longer or shorter, and may be stepped so that each row of guide grooves is slightly longer than the row of guide grooves immediately above it. Thus, to assemble these ferrules, the individual fibers of a group (e.g., row)—typically a ribbon or cable of fibers—are manually inserted into an opening in one end of the ferrule where they are separated and manually placed into their respective guide grooves to direct the fibers toward their respective fiber holes in the ferrule. Each fiber within the group or row is then manually inserted through its respective fiber hole at the other end of the ferrule and the assembly process continues for the next group or row of fibers. Once all of the fibers have been manually inserted within their respective fiber holes in the ferrule, then a material, such as an epoxy, is typically inserted into the ferrule to fix the fibers firmly in place.

Because of the increased need among users in the fiber optic field for larger groups or arrays of fibers, there is demand within the industry for single connector assemblies capable of handling arrays of fibers in excess 1×12 or 2×12 (e.g., 5×12, 5×16, 6×12, or N×M arrays). To address this industry need, the assignee of this application has developed a ferrule for large format arrays that is both cost-effective to manufacture and is reproducible to the required tolerances for a multi-fiber connector assembly. This large format array ferrule is described and illustrated in the co-pending, commonly assigned U.S. application Ser. No. 10/090,880 entitled "OPTICAL FIBER FERRULE," filed Mar. 4, 2002, which is incorporated by reference herein in its entirety.

In addition to satisfying the need for a multi-fiber connector assembly capable of handling a large format array of fibers, this ferrule completely or almost entirely eliminates the need for guide grooves or other internal guiding structures for directing each fiber towards its respective fiber hole in the ferrule. However, there are no procedures for insertion of the fiber into a N×M array ferrule with multiple rows (beyond two) containing no internal guiding structures. Without such internal guiding structures, insertion of the fiber into a N×M array ferrule using current conventional procedures practiced by connector companies is not possible.

SUMMARY OF THE INVENTION

These and other problems have be overcome by the system and method for fiber insertion described herein, which allows for insertion of fibers from a fiber cable (a ribbon or bundle) into a ferrule configured with fiber holes arranged in an N×M array, even in the absence of guide grooves or other internal guiding structures formed within the ferrule.

Advantageously, the invention is not limited to use with ferrules such as described in U.S. patent application Ser. No. 10/090,880 entitled "OPTICAL FIBER FERRULE," filed Mar. 4, 2002, which is incorporated by reference herein, it may also be used with any large format ferrule that lacks guide grooves or with a large format ferrule where the fiber holes are longer than 3000 microns.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The file of this patent contains at least one drawing executed in color. Copies of the patent with the color drawing(s) will be provided by the Patent and Trademark Office upon request and payment of the necessary fee.

DETAILED DESCRIPTION

Figure 1:
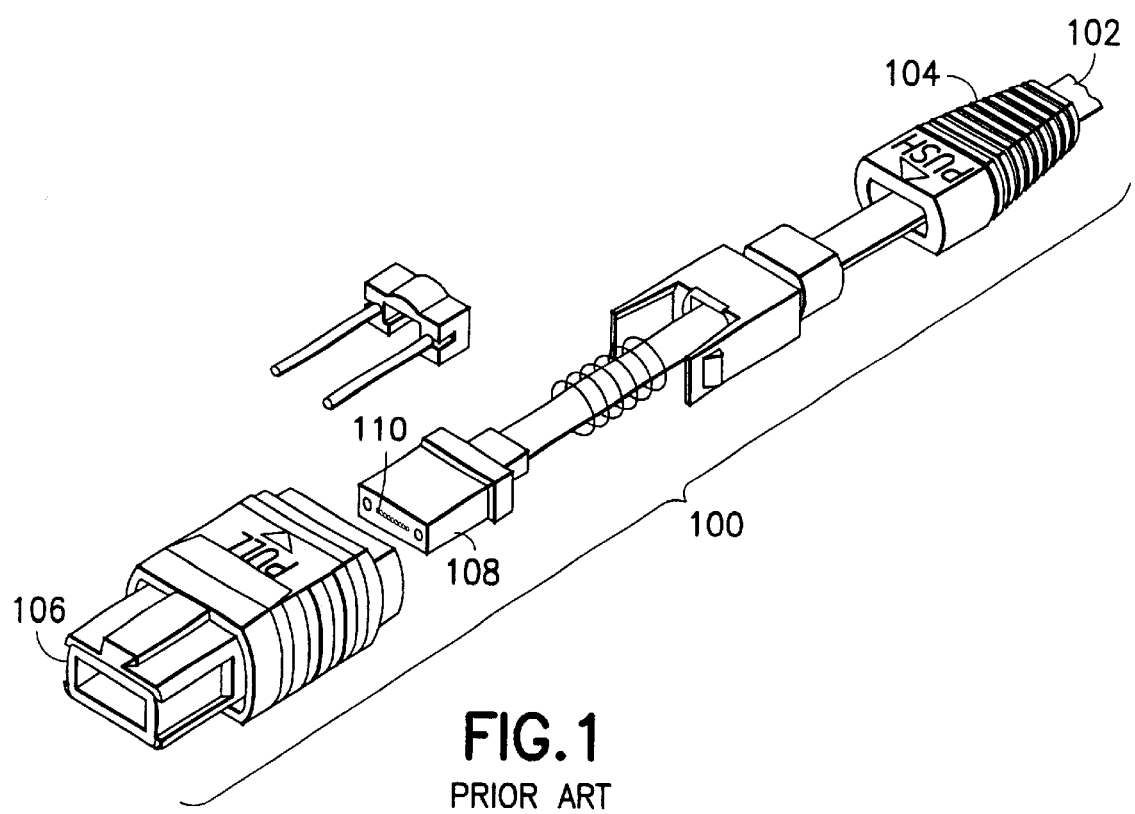
FIG. 1 is an exploded view of an optical fiber connector assembly for use in accordance with a preferred embodiment of the present invention.

FIG. 1 is an exploded view of a preferred optical fiber connector assembly 100 used to couple optical fibers together so that light transiting from a bundle 102 of multiple, individual optical fibers 110 (e.g., rows of ribbon cables of fibers) originating in one end 104 of the connector assembly 100 will pass through the connector assembly 100 to precision aligned fibers in a mating connector assembly or other device connected to the other end 106 of the connector assembly 100. The connector assembly 100 preferably includes a large format array ferrule 108 having an array of fiber holes into which each fiber 110 is inserted before assembly of the ferrule 108 and fibers 110 within the connector assembly 100. The ferrule 108 holds the fibers 110 in a precise position within their respective fiber holes and ensures that, when the connector assembly 100 is attached to a mating connector assembly or some other device, the fibers of the attached connector assemblies are properly aligned. A preferred ferrule 108 for use in connection with a preferred embodiment is described and illustrated in the co-pending, commonly assigned U.S. patent application Ser. No. 10/090,880 entitled "OPTICAL FIBER FERRULE," filed Mar. 4, 2002, which is incorporated by reference herein in its entirety.

Figure 2:
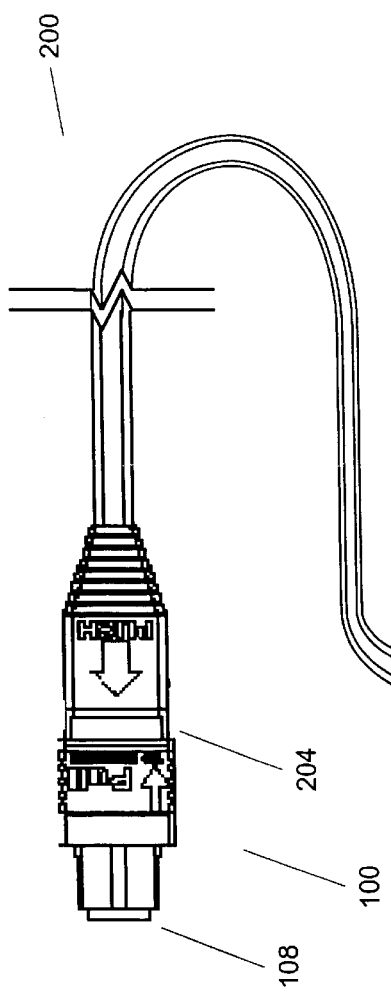
FIG. 2 is a fiber optic cable assembly incorporating an optical fiber connector assembly for use in accordance with a preferred embodiment of the present invention.

An example of a complete optical fiber cable 200 is illustrated in FIG. 2. The optical fiber cable incorporates a pair of connector assemblies 100 located at opposing ends of the optical cable 102 containing a bundle of multiple individual optical fibers—rows of ribbon cables of fibers where, for example, each ribbon preferably has at least six fibers. Each connector assembly 100, in this case, a female connector 204 and a male connector 206, includes a large format array ferrule 108 for use in accordance with a preferred embodiment of the present invention.

Figure 3:
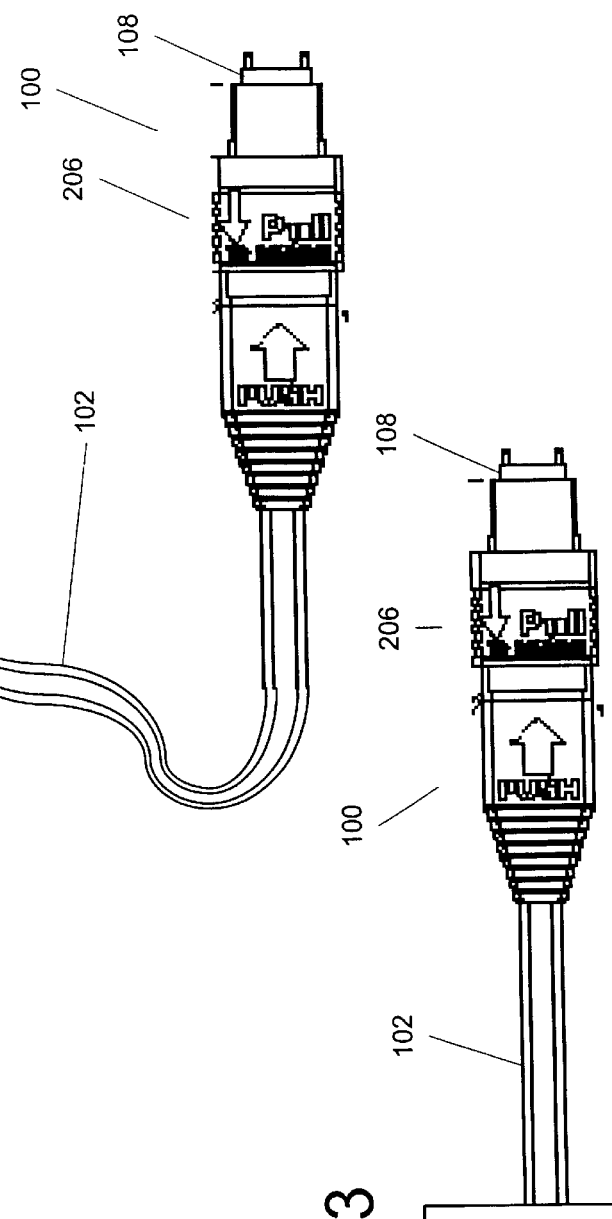
FIG. 3 is an alternative embodiment of the cable assembly of FIG. 2.

Another example of a complete optical fiber cable is illustrated in FIG. 3. In this example, the connector assembly 100—which is illustrated as a male connector 206, but can equally be a female connector 204—that houses the large array ferrule 108 may be attached to an element 304 (as opposed to the connector 204 illustrated in FIG. 2), which may be, for example, a different type of connector, a set of connectors in a fan-out configuration, a module (e.g., transmitter, receiver, transceiver, repeater, etc.) or some other device that can send, accept or pass light into or out of the fibers 102.

Figure 4:
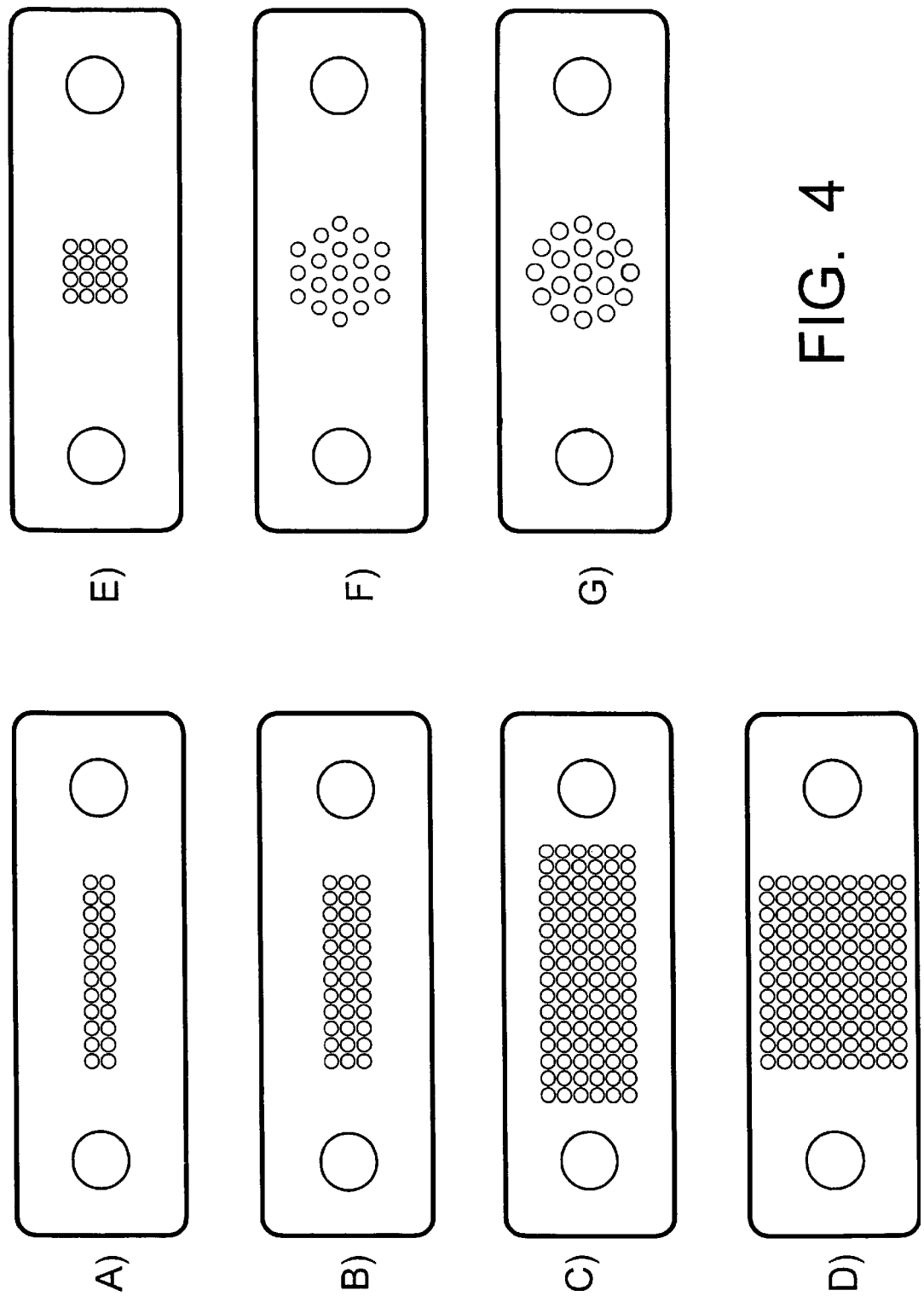
FIGS. 4A though 4G are exemplary arrangements of ferrules configured for large arrays of fibers.

As is explained in the co-pending, commonly assigned U.S. application Ser. No. 10/090,880 entitled "OPTICAL FIBER FERRULE," filed Mar. 4, 2002, which is incorporated by reference herein in its entirety, contrary to conventional wisdom and the teachings of the prior art, the preferred ferrule 108 for use in connection with a preferred embodiment of this invention has a forward portion—that portion of the ferrule through which the ferrule holes pass and defined by the separation between the face surface and the innermost part of the ferrule chamber—that is less than 3 mm in length and dispenses almost, if not entirely, with guide grooves or other internal guiding structure for directing the individual fibers into its respective fiber hole. As such, ferrule 108 may be configured for large arrays of fibers, including the following representative arrangements of single or multimode fibers illustrated in FIGS. 4A–4G that can be made with a pitch of 250 microns or less: (a) a large format rectangular array of fibers (FIG. 4A) (e.g., a 150 micron pitch for conventional 125 micron diameter (core+cladding) single mode and multimode fibers, or a 65 micron or less pitch for single mode fibers with as small as a 7–9 micron diameter (5 micron core+1–2 micron cladding)); (b) a three row rectangular array (FIG. 4B); (c) a six row rectangular array (FIG. 4C); (d) a nine row rectangular array (FIG. 4D); (e) a square array (FIG. 4E); (f) a hexagonal array (FIG. 4F); and (g) a circular array (FIG. 4G).

Figure 5:
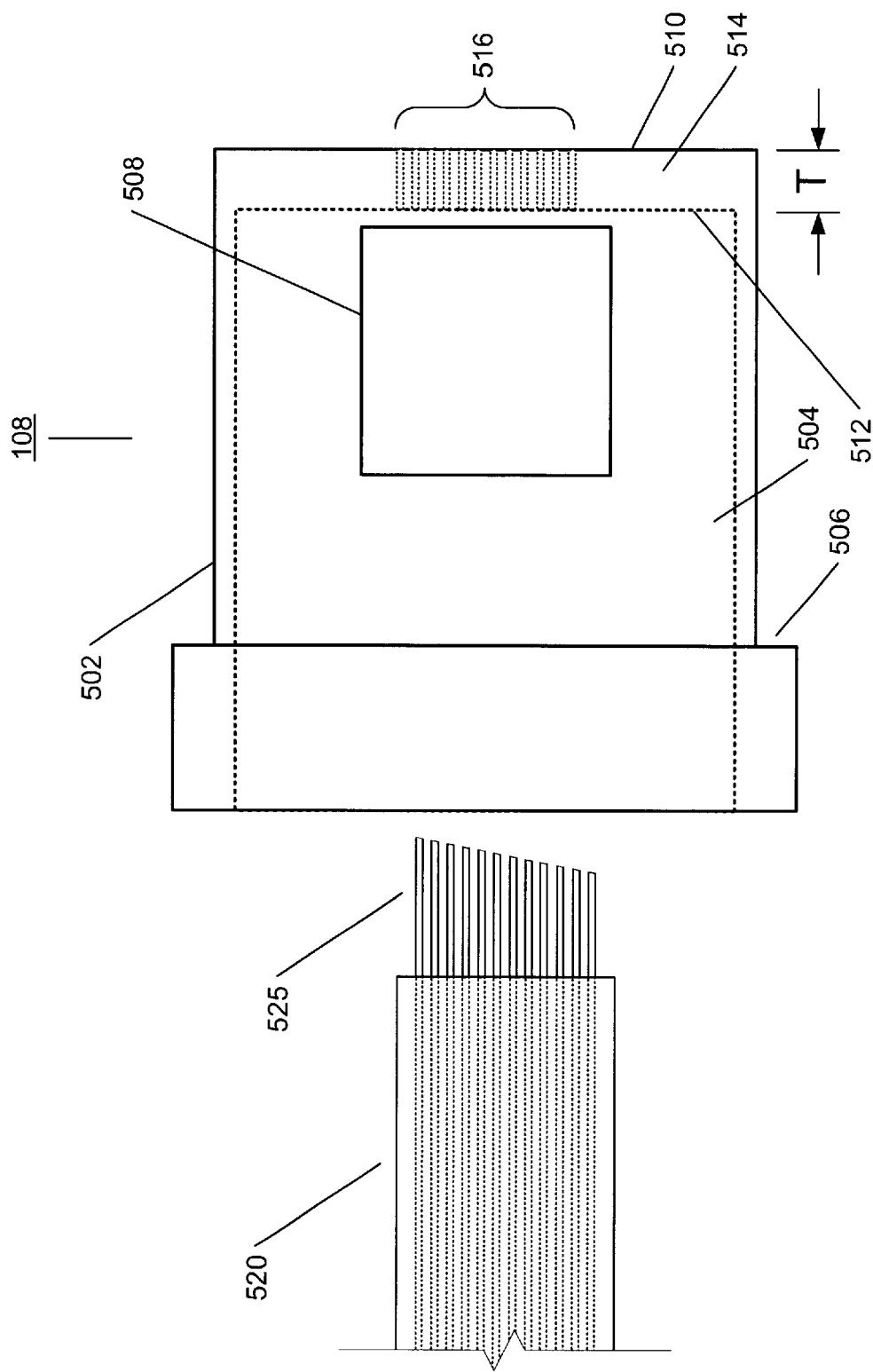
FIG. 5 is a simplified, representative example of a top view of a multi-row, large array ferrule prior to insertion of a ribbon fiber cable into the ferrule.
Figure 6:
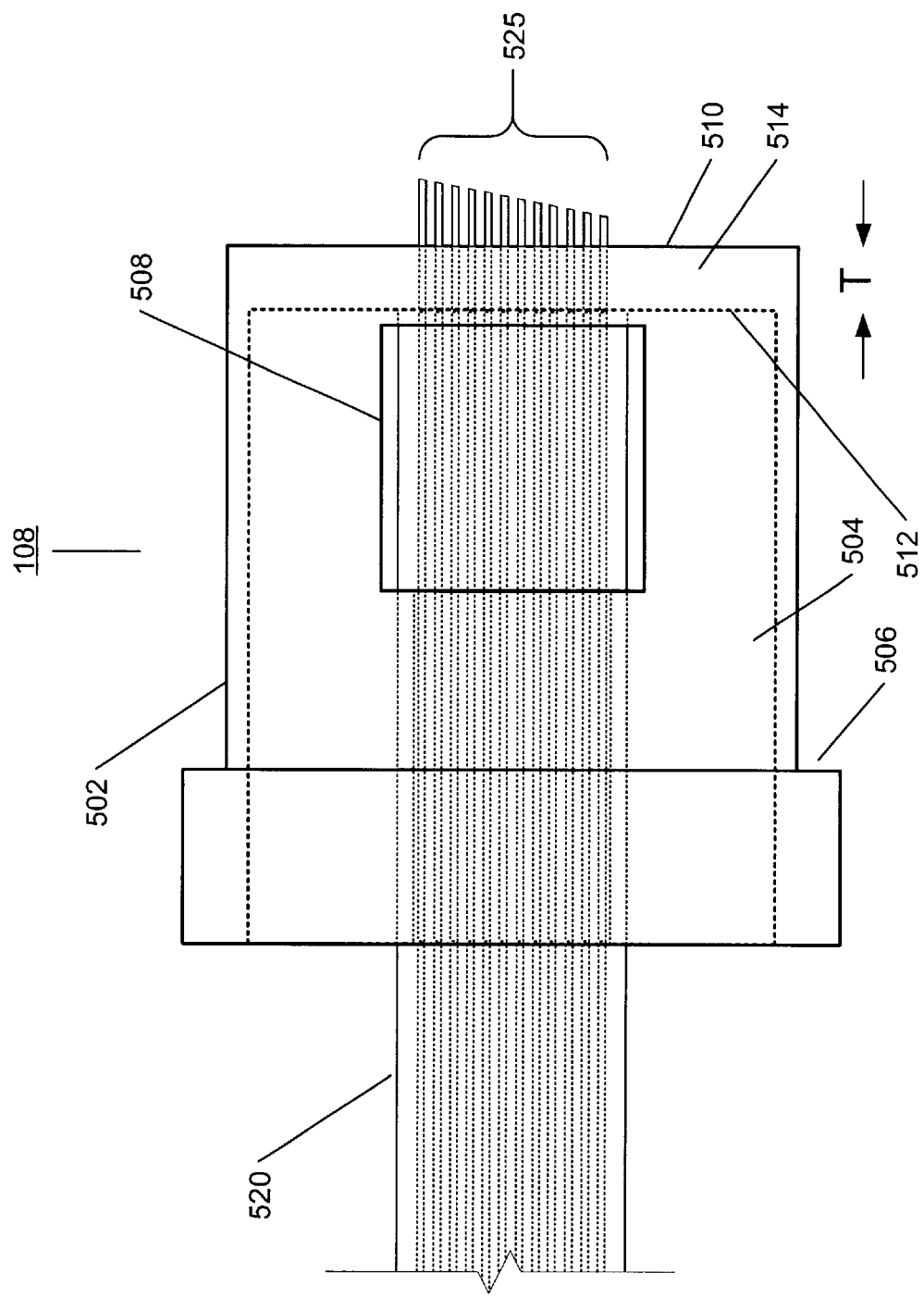
FIG. 6 illustrates the simplified, representative example of a top view of a multi-row, large array ferrule of FIG. 5 after the ribbon fiber cable has been inserted into the ferrule.

Referring now to FIGS. 5–6, there is shown a simplified, representative example of a top view of a multi-row, large array ferrule 108. A preferred ferrule 108 for use in connection with a preferred embodiment is described and illustrated in the co-pending, commonly assigned U.S. application Ser. No. 10/090,880 entitled "OPTICAL FIBER FERRULE," filed Mar. 4, 2002, which is incorporated by reference herein in its entirety.

The ferrule 108 is preferably dimensioned to be used in a commercially available connector, such as an ST, LC, MT-RJ, MTP, MPO, MPX or SMC connector to name a few. The ferrule 108 preferably includes a body 502, a chamber 504 defined by the body 502, a shoulder 506, an (optional) access window 508, a face surface 510, an inner surface 512, a forward portion 514 defined by the separation between the face surface 510 and the inner surface 512, multiple fiber holes 516 (shown in an exemplary arrangement of aligned rows having 12 holes per row). Preferably, the thickness "T" of the forward portion 514 of the ferrule 108 is less than 3,000 microns, most likely, within a range between approximately 150–1,000 microns.

FIG. 5 illustrates the ferrule 108 prior to insertion of a preferred ribbon fiber cable 520 into the ferrule 108. The ribbon fiber cable 520 preferably contains a row of individual, spaced apart optical fibers 525, which are shown extending from the ribbon fiber cable 520 in FIG. 5. Each optical fiber 525 is to be inserted into a respective fiber hole 516 in the ferrule 108. FIG. 6 illustrates the ferrule 108 after insertion of the optical fibers 525 of the ribbon fiber cable 500 into their respective fiber holes 516 in the ferrule 108.

A preferred method and system for fiber insertion into a large array ferrule 108 of a connector assembly 100 is described below with reference to FIGS. 7–30.

The system 700 includes a fiber insertion or termination fixture 710 that allows for insertion of optical fibers 525 contained in ribbon fiber cable 520 into a ferrule 108 configured with fiber holes 516 arranged in a N×M array, even in the absence of any internal guide grooves or other guiding structures formed in the ferrule 108. Using the fiber insertion or termination fixture 710, a 6×12 ferrule may, for example, be populated with fiber in approximately 10–20 minutes.

The fixture 710 to lay fiber and align it for insertion into ferrule 108 includes two fixed elements 720, 730 and a movable element 740. These elements 720, 730, 740 may be made from any of a variety of conventional materials, such as stainless steel, that may be machined or manufactured in a conventional manner to specific tolerances required for this type of fiber insertion application.

Figure 16:
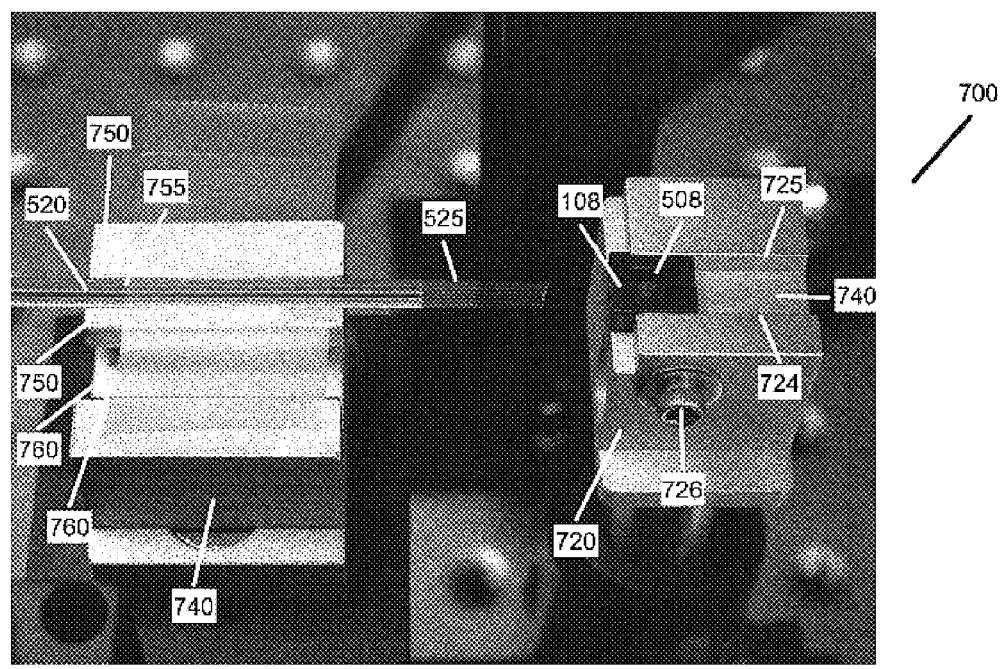
FIG. 16 is an enlarged photograph of the movable element and first element of the preferred system of FIG. 7, with the proximal end of a fiber ribbon cable positioned on the movable element and the ferrule positioned on the first element.
Figure 23:
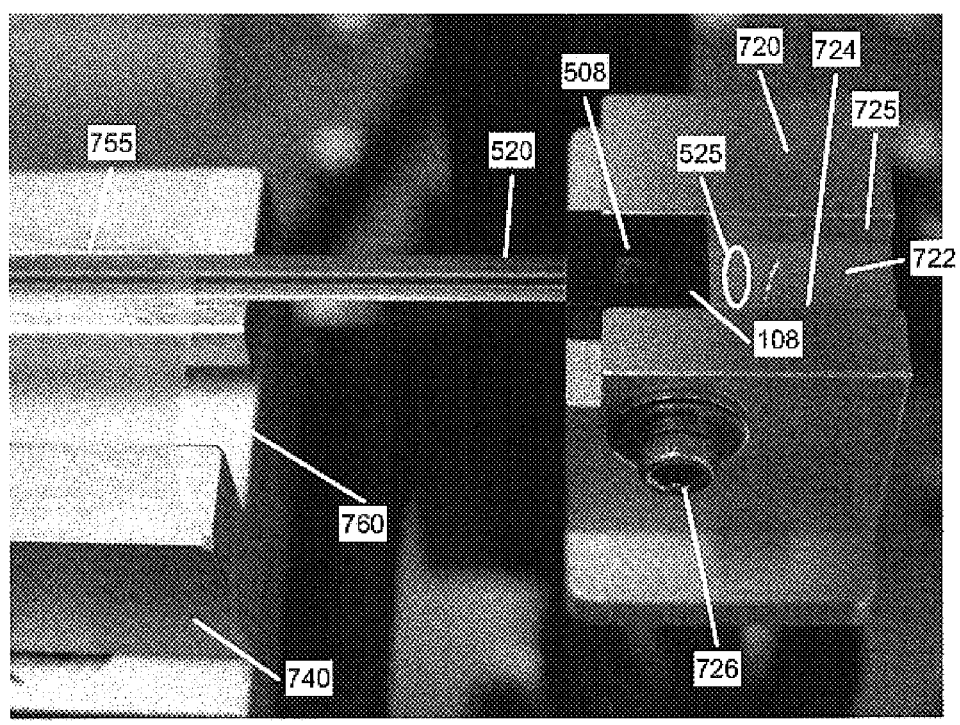
FIG. 23 is an enlarged photograph of the movable element and first element illustrating a first fiber ribbon cable fully inserted within the ferrule in accordance with a preferred embodiment of the invention.

The first fixed element 720 is designed to tightly hold the ferrule 108 during the fiber insertion procedure. As is best illustrated in FIGS. 16 and 23, the first fixed element 720 preferably has a relieved portion or channel 722 of sufficient width and depth to receive the ferrule 108. A side wall 724 of the relieved portion or channel 722 is adjustable relative to the opposing side wall 725 using a fastener 726 or other known methods to facilitate the clamping and subsequent release of the ferrule 108 within the first element 720.

The second fixed element 730 is used to manage the already inserted fiber ribbon cable(s) 520 as subsequent ribbon cable(s) are inserted into the ferrule 108. Preferably, a groove or channel is formed in an upper surface of the second fixed element so that the already inserted fiber ribbon cable(s) 520 may be temporarily fixed within the second element 730 in a conventional manner, such as using tape or an adhesive to hold the already inserted fiber ribbon cables onto the second fixed element 730.

The movable element 740 has two portions, an upper portion 750 and a lower portion 760. The upper portion 750 is used to mount and position a given fiber ribbon cable 520 to be inserted into the ferrule 108. The upper portion 750 of the movable element 740 includes a grooved area or channel 755 in which the fiber ribbon cable 520 sits to help align that ribbon cable along the proper axis toward the fiber holes 516 in the ferrule 108. Preferably, the grooved area or channel 755 is just slightly wider than the width of the fiber ribbon cable.

To assist in managing the fiber ribbon cable(s) 520 that have already been inserted into the ferrule 108 during the fiber insertion process, the lower portion 760 of the movable element 740 includes a opening or recess 765 for loosely accommodating and separating the fiber ribbon cable(s) 520 that have already been inserted into the ferrule 108 from the next fiber ribbon cable to be inserted into the ferrule.

The movable element 740 also includes at least three micro-positioners 770 for fine adjustment of the movable element 740 and attached fiber ribbon cable 520 in the x-y-z axes, respectively, as it is guided into the ferrule 108. The micro-positioners 770 can be conventional positioning devices that are known in the art.

The preferred system 700 also includes dual video cameras 780, 782 connected to at least one video monitor 783 for displaying the image viewed by the video camera(s) 780, 781. The video camera 780 is positioned in a manner so as to provide a "top-down" image 786 of the ferrule 108 on the video monitor 782 in a direction looking down from above the ferrule 108 through the ferrule access window 508. As best illustrated in FIGS. 7–8 and 12–14 the video camera 780 is preferably positioned in a horizontal direction toward a mirror 784 mounted above the access window 508 of the ferrule 108 to facilitate viewing of the fibers 525 and cable 520 through the ferrule access window 508. The "top down" view 786 through the ferrule access window 508 allows visual monitoring of any bending of individual fibers 525 during insertion into the ferrule 108. Representative images displayed on the monitor 783 of the "top-down" view 786 through the ferrule access window 508 are illustrated in FIGS. 12, 19, 20 and 29.

Similarly, as best illustrated in FIGS. 7–8 and 12–14, the video camera 781 is positioned in a manner so as to provide a "face-on" image 788 of the ferrule 108 looking through the fiber holes 516 into the ferrule. This provides a detailed view of the individual optical fibers 525 in the fiber ribbon cable(s) 520 as they are inserted into the fiber holes 516 of the ferrule 108. Representative images displayed on the monitor 783 of the "face-on" view 788 through the ferrule 108 are illustrated in FIGS. 7, 13, 21, 22 and 30.

Figure 7:
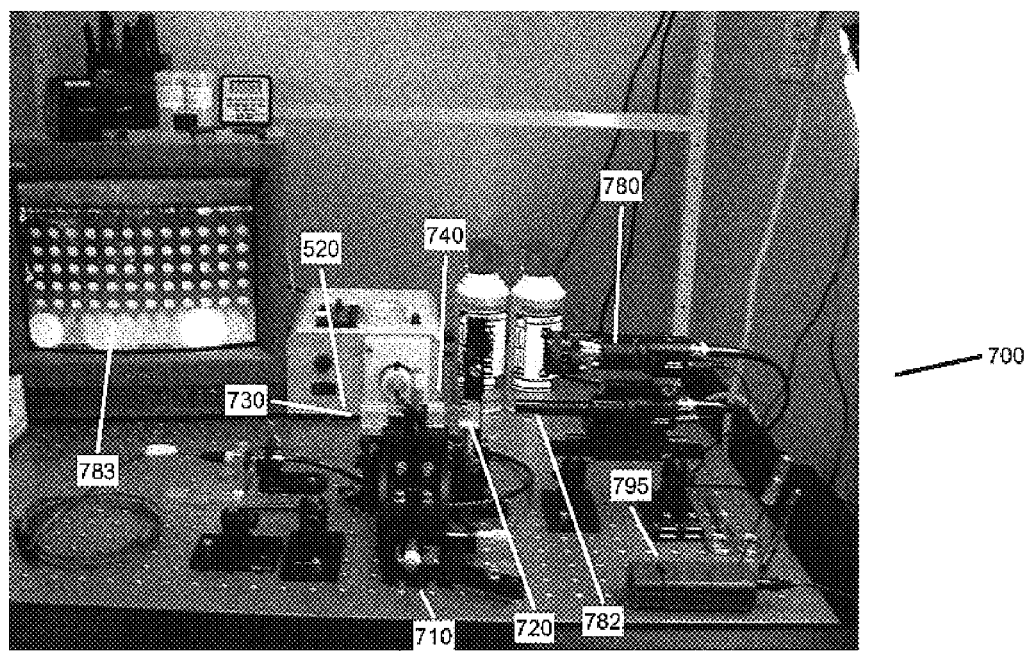
FIG. 7 is a photograph of a preferred system in accordance with the present invention.
Figure 8:
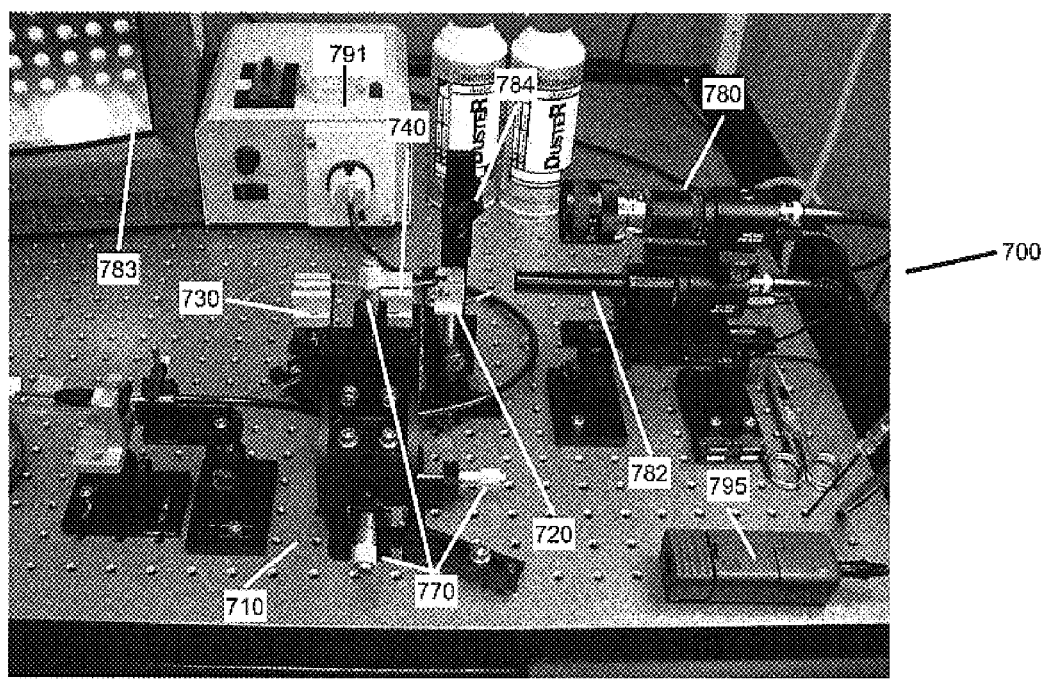
FIG. 8 is a photograph of the preferred system of FIG. 7.
Figure 9:
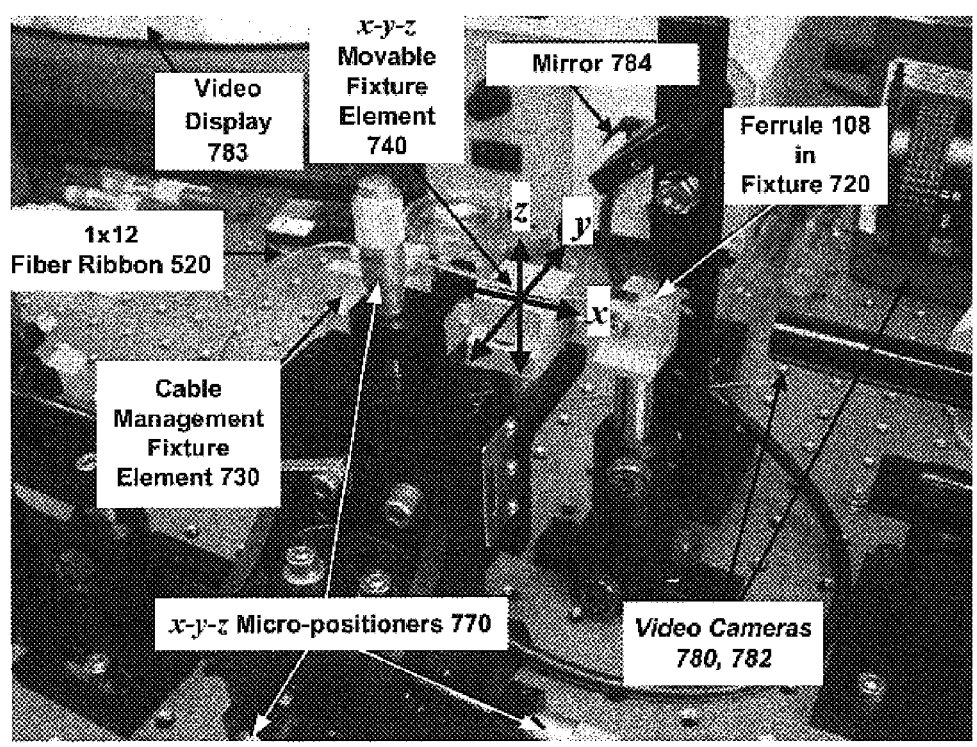
FIG. 9 is an enlarged photograph of a preferred fiber insertion or termination fixture of the preferred system of FIG. 7.
Figure 10:
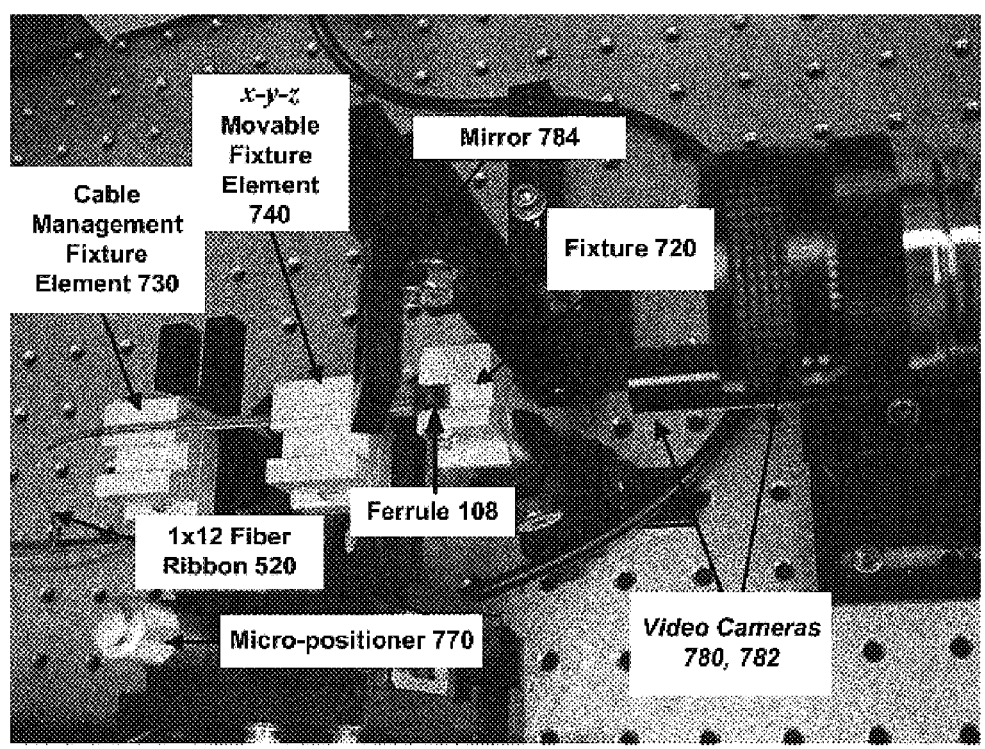
FIG. 10 is a photograph of a top view of the preferred fiber insertion or termination fixture of FIG. 9.
Figure 11:
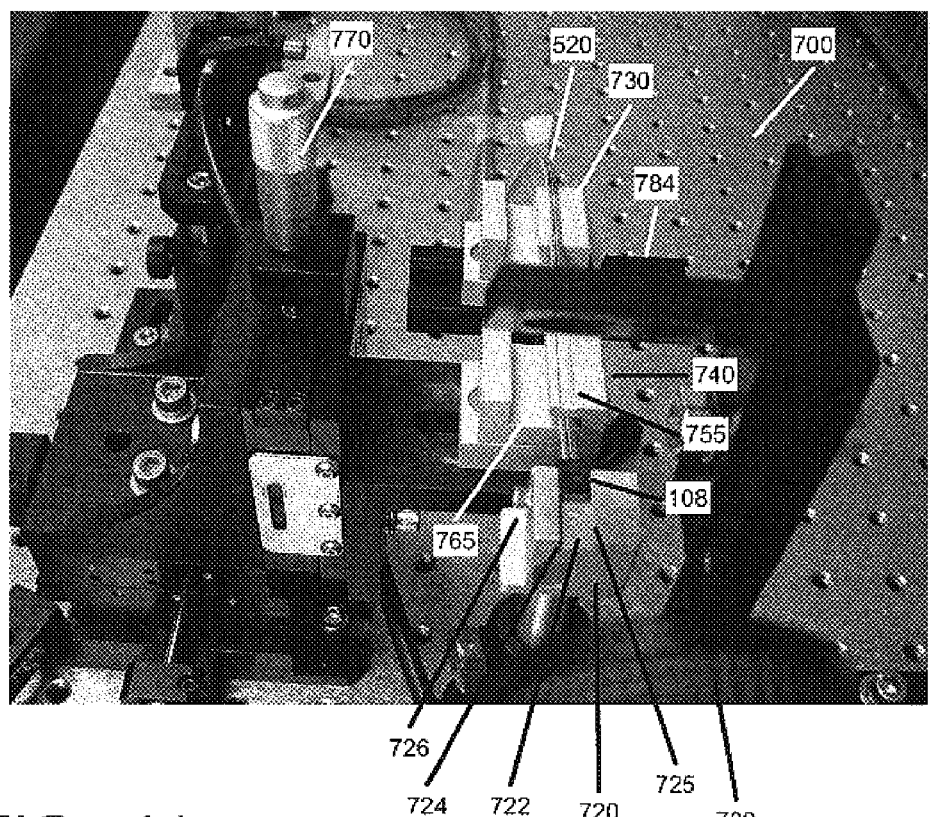
FIG. 11 is a photograph of a side elevation view of the preferred a fiber insertion or termination fixture of FIG. 9.
Figure 12:
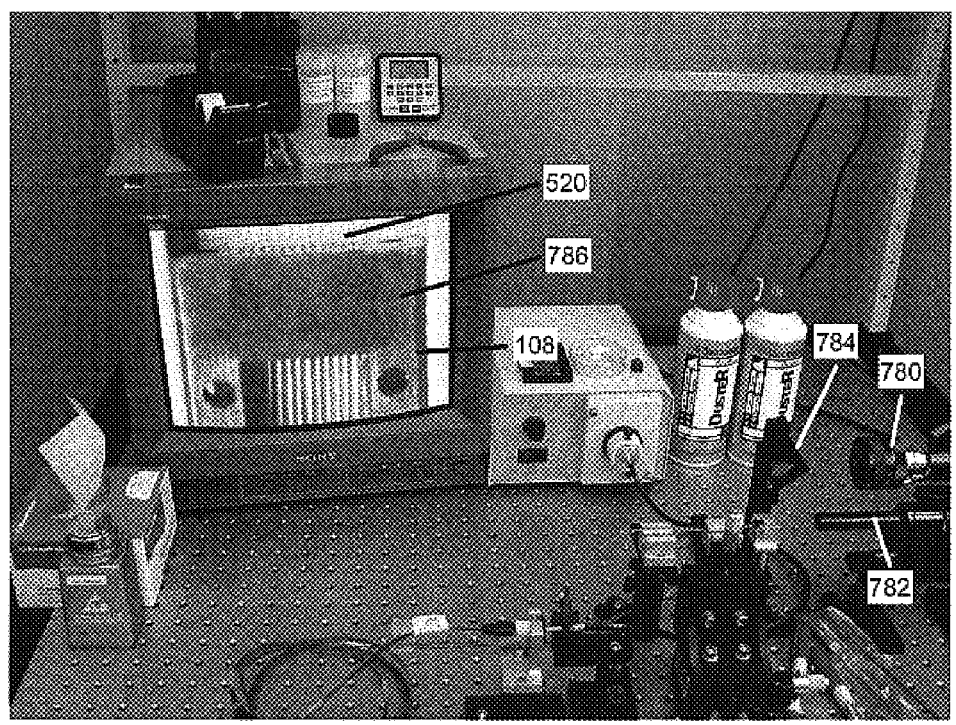
FIG. 12 is a photograph of a display showing a "top-down" view of a ferrule in accordance with the preferred system of FIG. 7.
Figure 13:
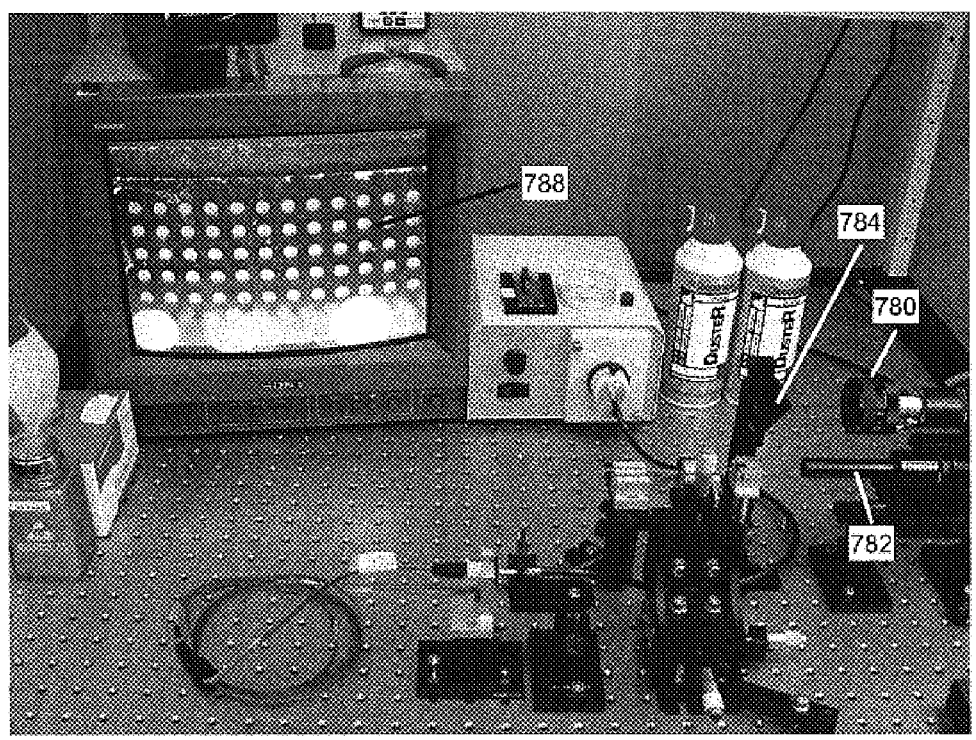
FIG. 13 is a photograph of a display showing a "face-on" view of the ferrule in accordance with the preferred system of FIG. 7.
Figure 17:
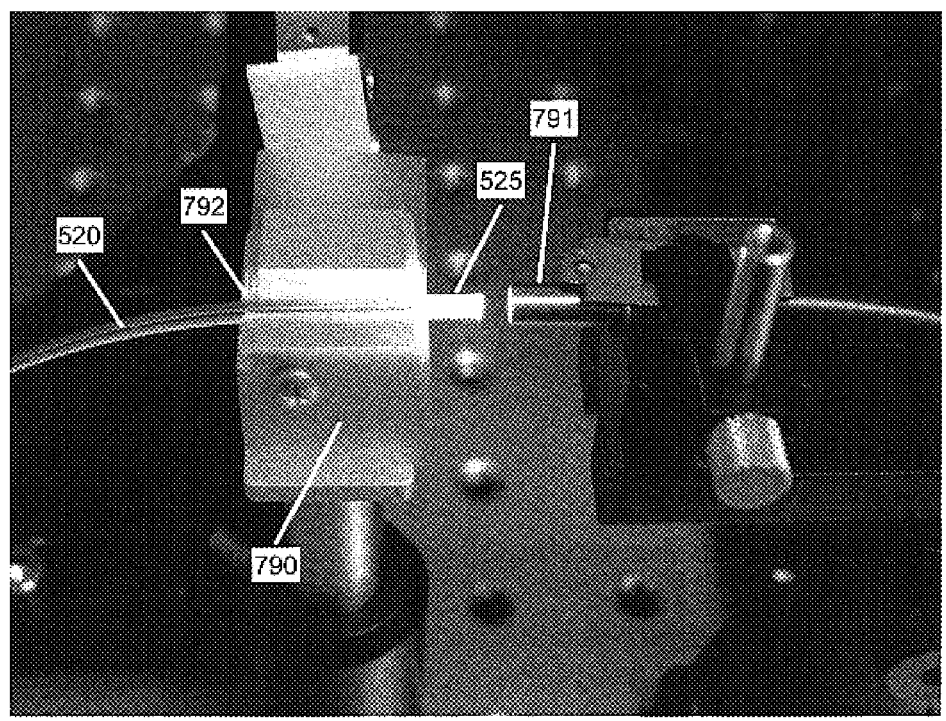
FIG. 17 is a photograph of a preferred distal end fixture for holding the distal end of the fiber ribbon cable and light source for illuminating the core of the fibers contained within the ribbon cable in accordance with the preferred system of FIG. 7.

Referring to FIGS. 7, 8 and 17, a light source 791 is used to illuminate the cores of the fibers 525 in the ribbon fiber cable 520 being inserted into the ferrule 108 to aid in aligning the fibers in the ribbon fiber cable to the fiber holes 516 in the ferrule 108. As best illustrated in FIG. 17, a distal end fixture 790 is provided for mounting the distal end of the fiber ribbon cable 520 in aligned relation with the light source 791 so that the light source illuminates the cores of all fibers 525 contained in the ribbon cable. The distal end fixture 790 may include a groove or recess 792 for mounting the distal end of the fiber ribbon cable 520. The fiber ribbon cable 520 may be temporarily held in place on the fixture 790 using tape, adhesive or other known mounting or clamping methods. The light source 791, which may be a conventional light source, must be capable of directing light through the cores of the individual fibers 525 and many conventional light sources are suitable for use with this system and process.

Figure 26:
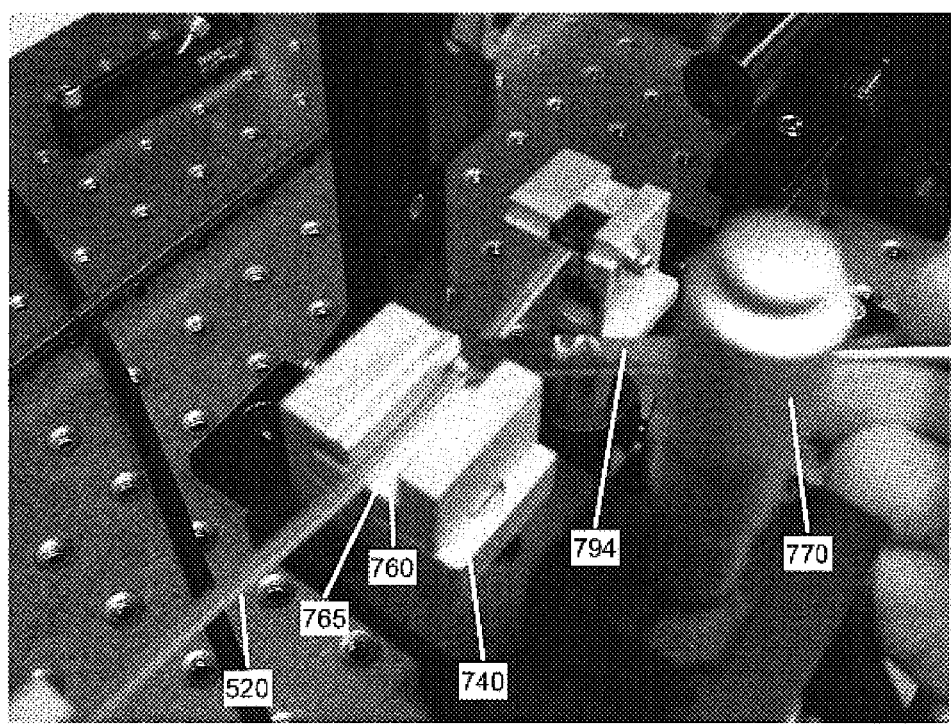
FIG. 26 is a photograph of the fiber insertion or termination fixture illustrating the repositioning of an inserted fiber ribbon cable from an upper portion to a lower portion of the movable element in accordance with a preferred embodiment of the invention.

Referring to FIG. 26, a flat tool 794 or other instrument similar to a dull scalpel may preferably be used to aid in repositioning the fiber ribbon cables 520 during insertion and to help manage the already inserted fiber ribbon cables.

A preferred process for inserting optical fiber ribbon cable(s) 520 into a ferrule 108 is described further below. Insertion of fiber ribbon cables 520 into the ferrule 108 is performed one ribbon cable at a time starting at the bottom row of the array of fiber holes 516 and working upward one fiber ribbon cable at a time.

Figure 14:
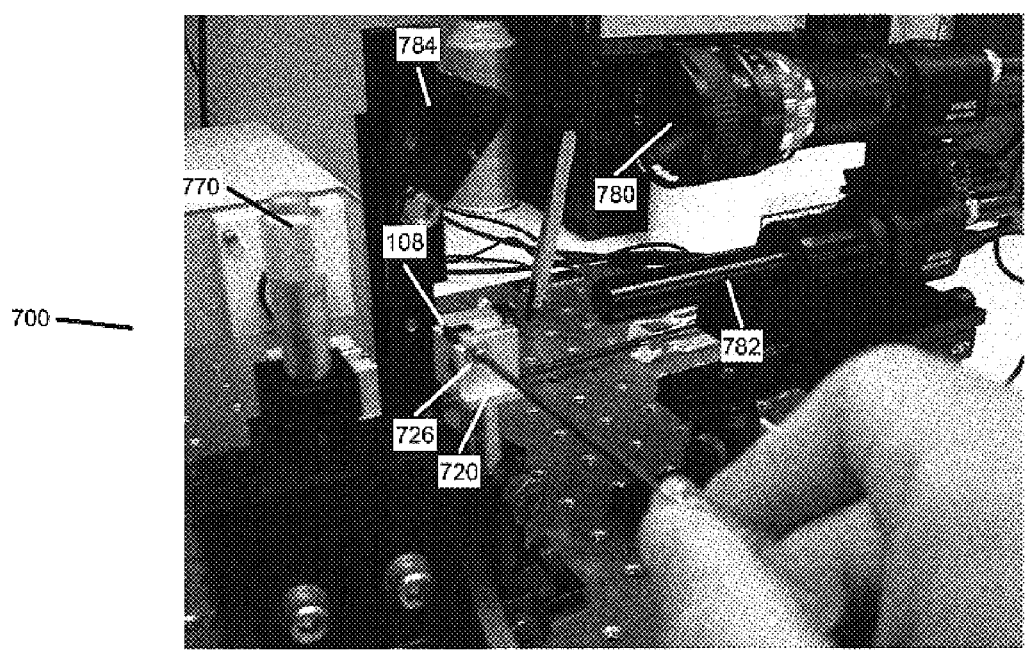
FIG. 14 is a photograph illustrating the positioning of a ferrule within a preferred first element of the preferred system of FIG. 7.
Figure 15:
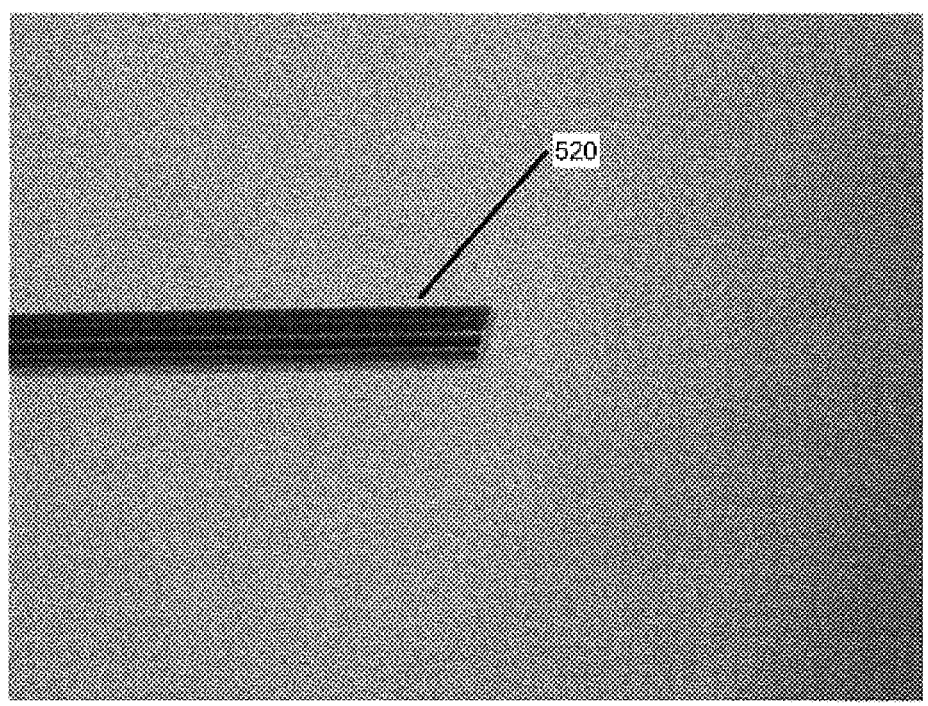
FIG. 15 is a photograph of the proximal end of a fiber ribbon cable cut at an angle in accordance with a preferred embodiment of the invention.

As best shown in FIGS. 14 and 16, a ferrule 108 is inserted into and clamped within the relieved portion or channel 722 of the first fixed element 720 (step S100). In the preferred embodiment, a screw 726 is tightened to clamp the ferrule 108 within the first fixed element 720. The ferrule 108 is preferably clamped in the first fixed element 720 so that the ferrule fiber holes 516 lie on a horizontal plane, the ferrule access window 508 faces upward toward the mirror 784, and the ferrule face surface 510 being furthermost from the movable element 740.

The movable element 740 is then set to its "home" position using the micro-positioners 770 with its upper surface 750 at roughly the same level as the ferrule 108, its groove 755 aligned with the ferrule 108, and moved in a direction away from the ferrule 108 as far as possible (Step S110).

It has been found that cutting the fiber ribbon cables 520 at an angle to the short axis of the fiber ribbon cable assists in insertion of one fiber 525 at a time for a given fiber ribbon cable 520. Thus, as best shown in FIGS. 5, 6, 15, 16 and 19, the proximal end of the fiber ribbon cables 520 is preferably cut at an angle of approximately 30 degrees to the direction perpendicular to the length of the ribbon cable (i.e., the short of the fiber ribbon cable) (Step S120).

The fiber ribbon-cable(s) 520 is then prepared for insertion by stripping the proximal end of the fiber ribbon cable to expose the individual fibers 525 and cleaning it with isopropyl alcohol or other suitable materials (Step S130). This can be accomplished by using a conventional ribbon fiber stripper 795, such as that shown in FIGS. 7 and 8. Preferably, the fiber ribbon cable 520 is stripped to expose approximately ¾ inch of individual fibers 525.

As best shown in FIG. 16, the proximal end of a stripped fiber ribbon cable 520 to be inserted within the ferrule 108 is then mounted on the movable element 740 aligned to the ferrule by inserting the fiber ribbon cable into the grooved area or channel 755 and temporarily fixing it in place on the movable element 740 (Step S140). This may be accomplished using tape, adhesive or other known mounting or clamping methods.

As shown in FIG. 17, the distal end of the fiber ribbon cable 520 is mounted in a distal end fixture 790 aligned with a light source 791 so that the light source illuminates the cores of all fibers 525 contained in the ribbon cable (Step S150). The distal end fixture 790 may include a groove or recess for mounting the distal end of the fiber ribbon cable 520. The fiber ribbon cable 520 may be temporarily held in place on the fixture 790 using tape, adhesive or other known mounting or clamping methods. The light source 791 must be capable of directing light through the cores of the individual fibers 525 and many conventional light sources are suitable for use with this system and process.

Figure 18:
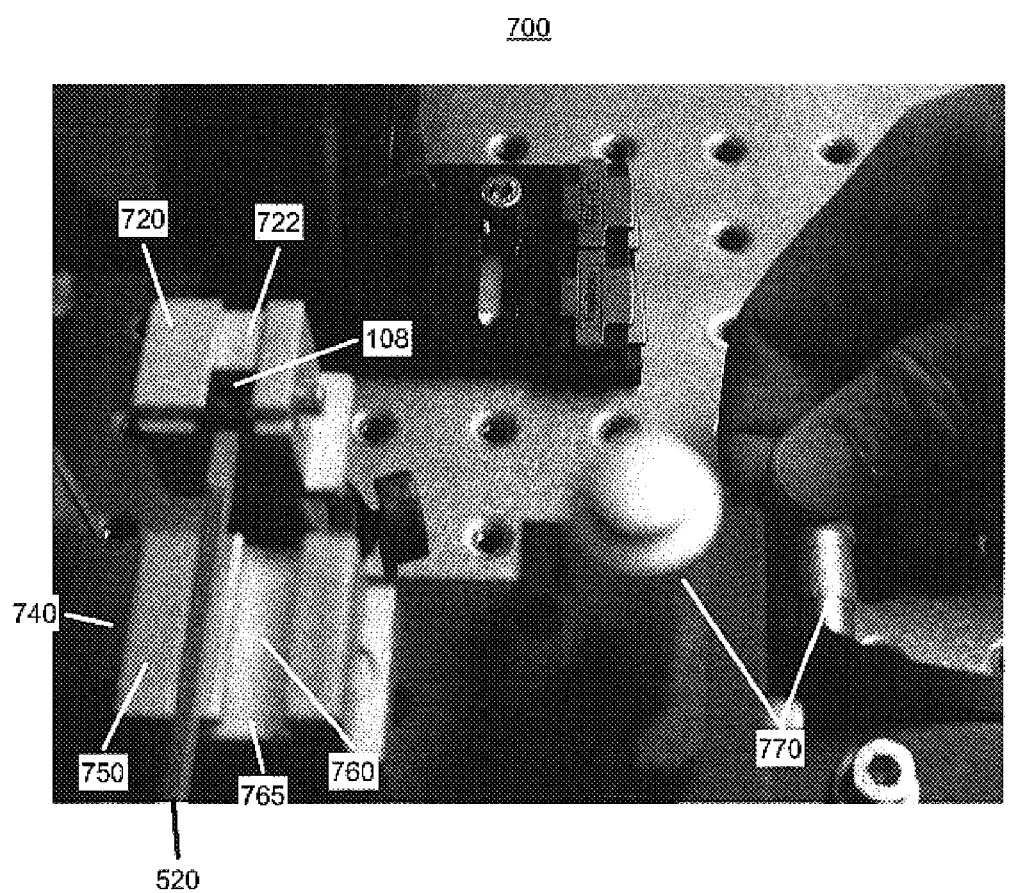
FIG. 18 is a photograph illustrating the use of a micro-positioner on the movable element in accordance with the preferred system of FIG. 7.
Figure 19:
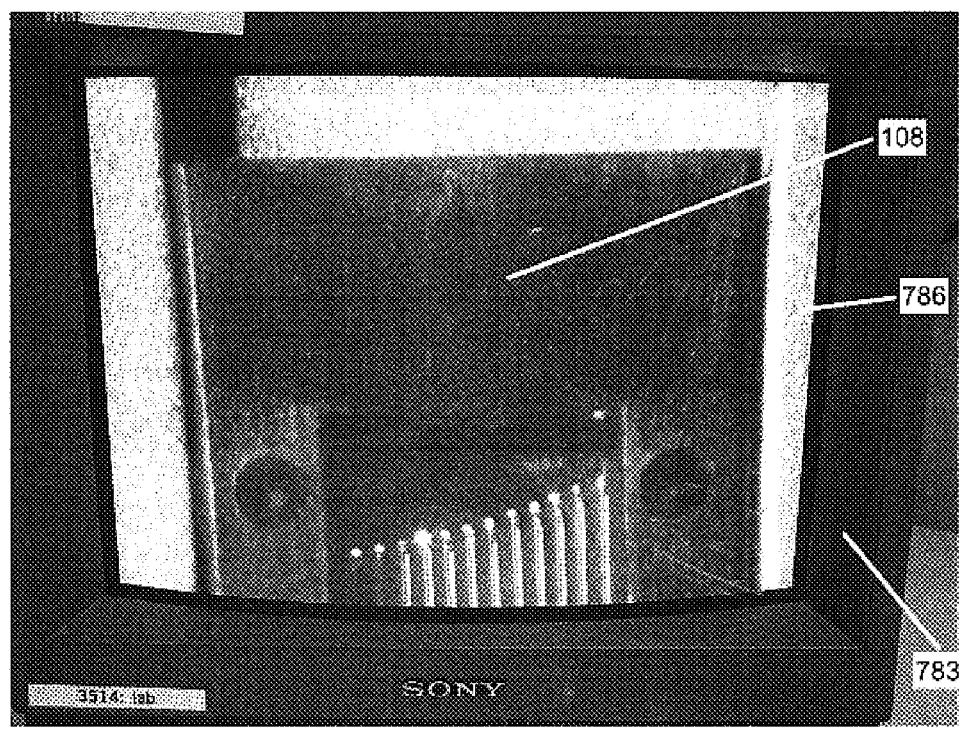
FIG. 19 is a photograph of a preferred display showing a "top-down" view through an access window of a ferrule in accordance with the preferred system of FIG. 7.
Figure 20:
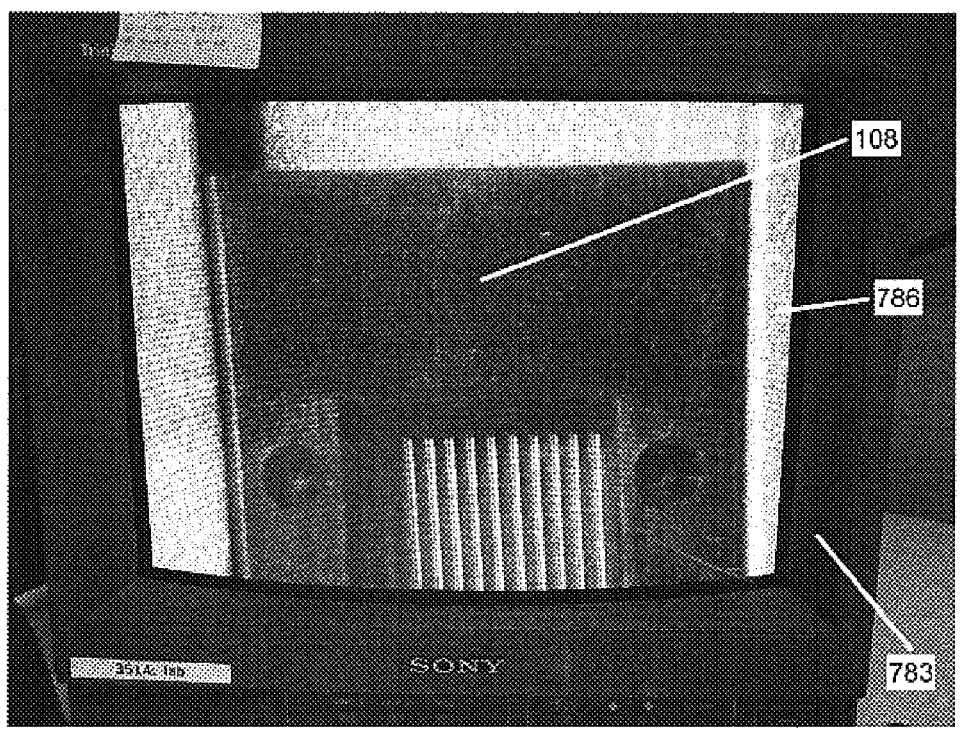
FIG. 20 is a photograph of the preferred display showing the "top-down" view of FIG. 19 with the fiber ribbon cable inserted further into the ferrule.
Figure 21:
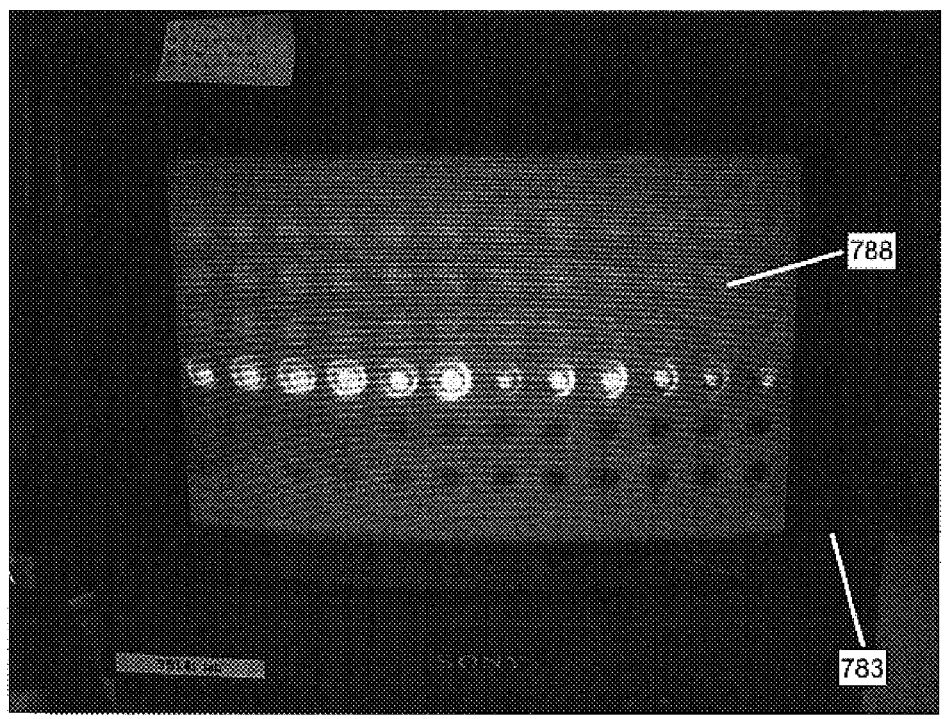
FIG. 21 is a photograph of a preferred display showing a "face-on" view of the ferrule in which horizontal alignment of the fibers relative the ferrule fiber holes is good, but vertical alignment of the ribbon cable relative the desired row of ferrule fiber holes is too high.
Figure 22:
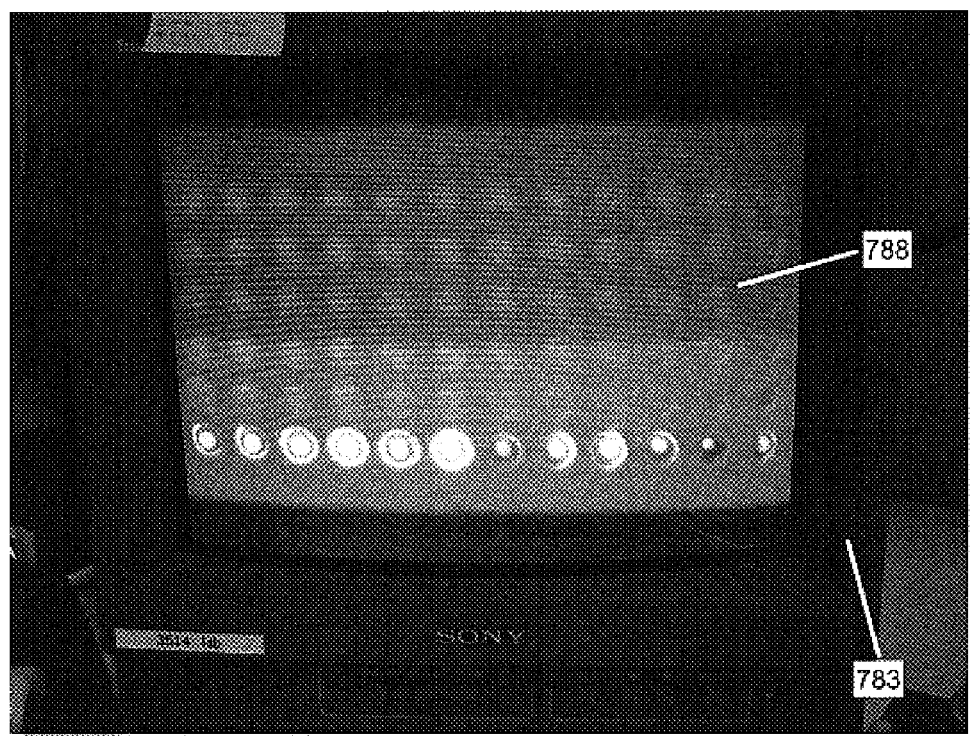
FIG. 22 is a photograph of a preferred display showing a "face-on" view of the ferrule in which horizontal and vertical alignment of the fibers relative the ferrule fiber holes is good.

Referring to FIG. 18, the proximal end of the fiber ribbon cable 520 is moved into the ferrule 108 by adjusting the micro-positioners 770 on the movable element 740 along x-y-z axes until the longest fiber 525 ends are adjacent the bottommost row of fiber holes 516 in the ferrule 108 (Step S160). This is best accomplished by using the cameras 781, 782 to display preferably first the "top-down" view through the ferrule access window (FIGS. 19–20), and then the "face-on" view of the ferrule 108 (FIGS. 21–22). The flat tool 794 or other hand tool similar to a dull scalpel may be used to assist in this process.

Once the fibers 525 are aligned with and adjacent to their respective ferrule fiber holes 516, each fiber 525 of the angle-cut ribbon cable 520 is eased into its respective ferrule fiber hole 516 one at a time by manipulating the micro-positioners 770 on the movable element 740 to adjust the position of the ribbon cable up/down & left/right (Step S170). As shown in FIG. 22, this may be accomplished using the camera 782 to view the ferrule "face-on" on the display 783.

Figure 24:
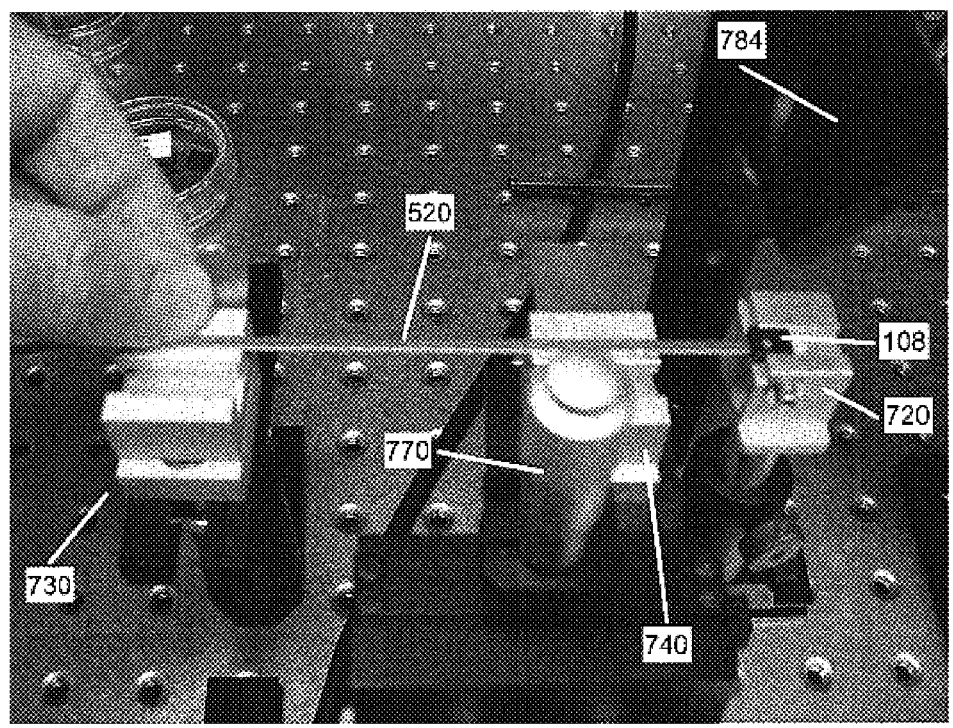
FIG. 24 is a photograph of the fiber insertion or termination fixture illustrating the positioning of an inserted fiber ribbon cable on the second element in accordance with a preferred embodiment of the invention.
Figure 25:
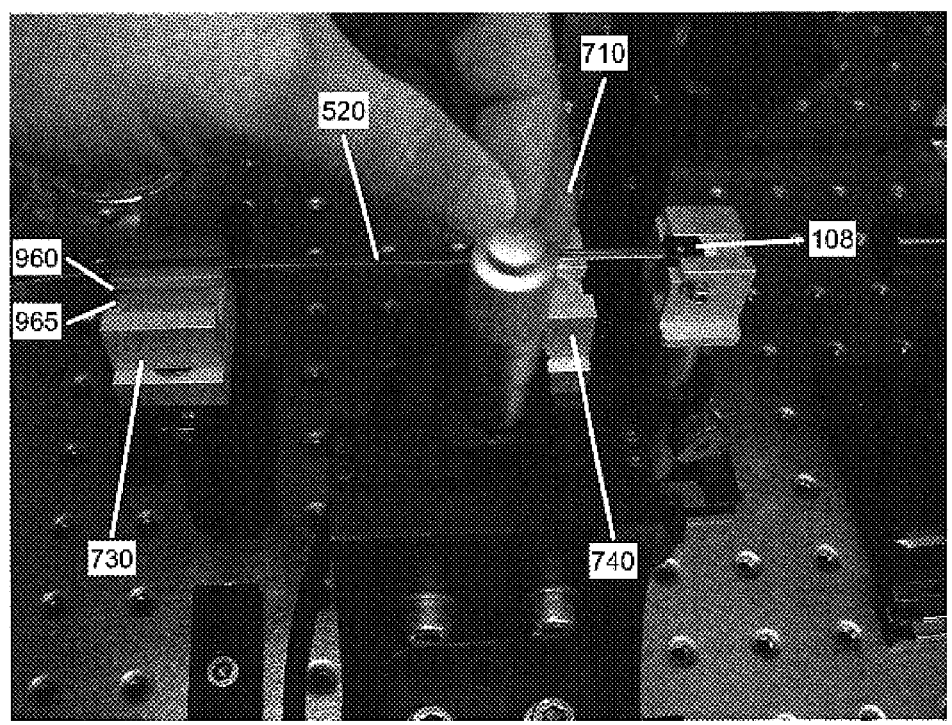
FIG. 25 is a photograph of the fiber insertion or termination fixture illustrating the releasing of an inserted fiber ribbon cable from the movable element in accordance with a preferred embodiment of the invention.

Referring to FIGS. 24–25, once all of the individual fibers 525 contained in the ribbon cable 520 are fully inserted into their respective ferrule fiber holes 516—preferably ½ inch of bare fiber should protrude beyond the ferrule 108—the inserted fiber ribbon cable 520 is temporarily fixed in place on the second fixed element 730 and released from the movable element 740 of the fixture 710 (Step S180).

Figure 27:
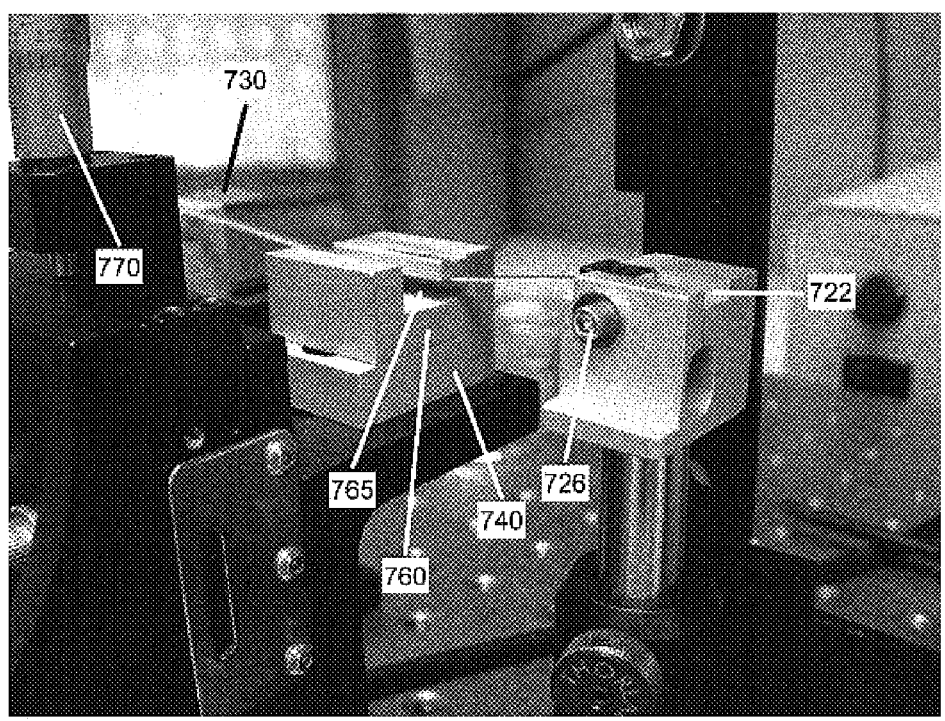
FIG. 27 is a photograph of the fiber insertion or termination fixture illustrating the an inserted fiber ribbon cable positioned within the lower portion of the movable element in accordance with a preferred embodiment of the invention.
Figure 28:
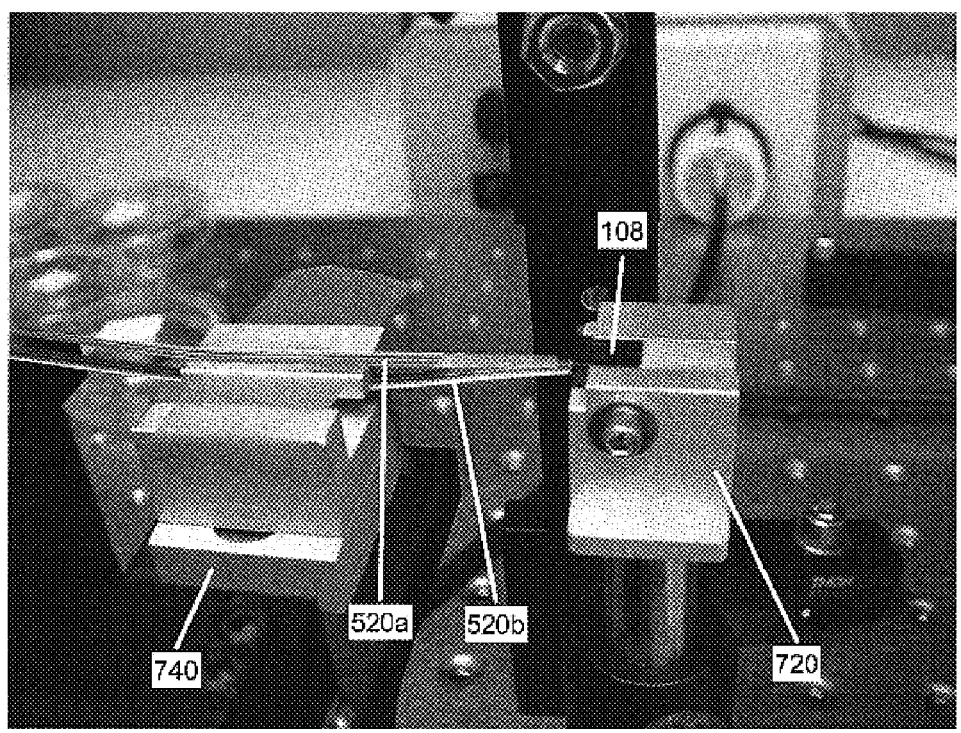
FIG. 28 is a photograph of the fiber insertion or termination fixture illustrating the positioning of a second fiber ribbon cable above an inserted fiber ribbon cable on the movable element in accordance with a preferred embodiment of the invention.

As shown in FIGS. 26–27, the inserted fiber ribbon cable 520 is then manipulated into the opening or recess 765 of the lower portion 760 of the movable element 740, preferably using the micro-positioners 770 and the flat tool 794 to assist (Step S190). By fixing the inserted fiber ribbon cable(s) 520 to the second fixed element 730 and carrying the inserted ribbon cables in the lower portion 760 of the movable element 740, the inserted fiber ribbon cables are segregated from and do not interfere with the insertion of other fiber ribbon cables. FIG. 28 illustrates the positioning of a second fiber ribbon cable 520a above an inserted fiber ribbon cable 520b on the movable element above an inserted fiber ribbon cable on the movable element 740. The movable element 740 is then returned to its "home" position as described above using the micro-positioners 770 (Step 200).

Figure 29:
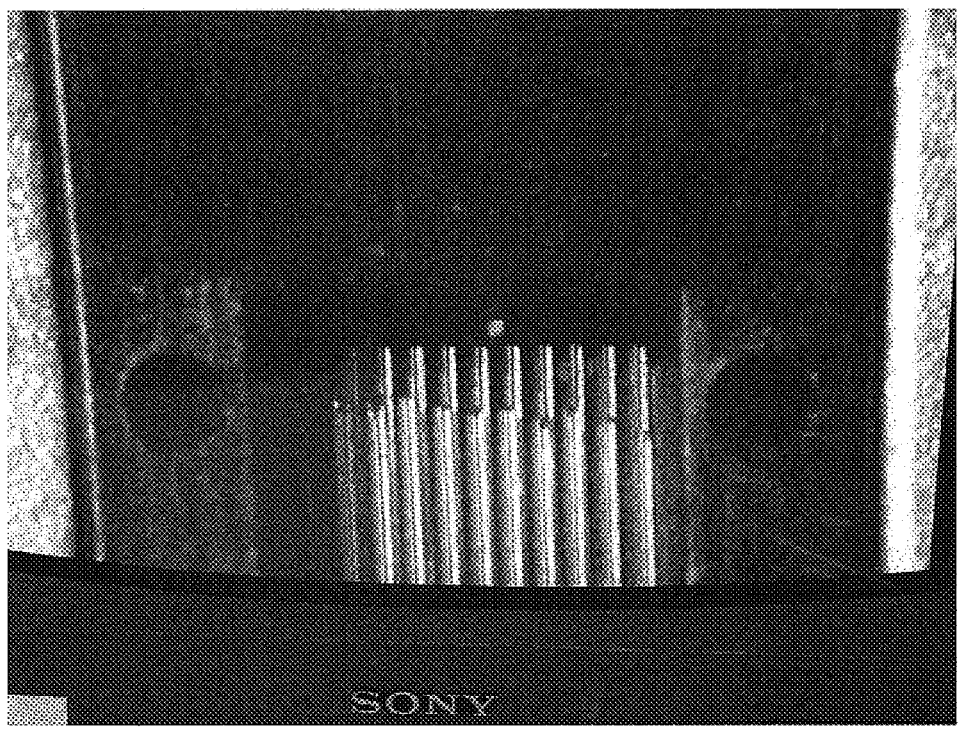
FIG. 29 is a photograph of a preferred display showing a "top-down" view of a second fiber ribbon cable above an already inserted fiber ribbon cable through an access window of a ferrule in accordance with the preferred system of FIG. 7.
Figure 30:
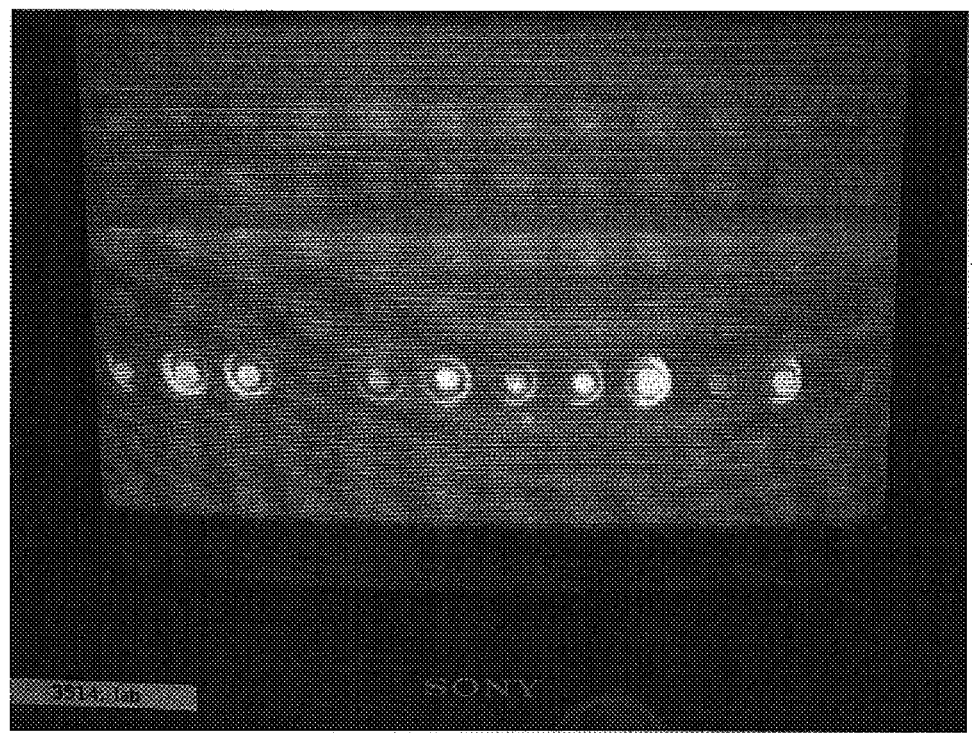
FIG. 30 is a photograph of a preferred display show a "face-on" view of a second fiber ribbon cable ready to be inserted into a row of fiber holes above an already inserted fiber ribbon cable in accordance with the preferred system of FIG. 7.

Steps 100–200 are repeated for each additional fiber ribbon cable 520 until every row of fiber holes 516 in the ferrule 108 is filled with fibers 525 (Step 210). FIG. 29 shows a "top-down" view of the second fiber ribbon cable above an already inserted fiber ribbon cable through the access window 508 of a ferrule 108. Similarly, FIG. 30 illustrates fibers contained in the second fiber ribbon cable ready to be inserted into a row of fiber holes above an already inserted fiber ribbon cable.

Once fibers 525 have been successfully inserted in all of the ferrule fiber holes 516, the ferrule 108 is preferably potted or filled with an epoxy or other suitable material (Step 220). In addition, the bundle of bare fiber 525 protruding beyond the ferrule 108 may also be filled with an epoxy or other suitable material (Step S230). Where epoxy is used, the epoxy should preferably be permitted to cure for 30 minutes at a temperature of 85° C. (Step S240) unless otherwise specified by the epoxy manufacturer. The cured protruded fiber bundle filled with epoxy may then be cut to a length of preferably ¼ inch (Step S250). The ferrule may then be hand polished using, for example, 30μ SiC film, until the length of the epoxy filled fiber bundle is between preferably ⅛ inch to 1/16 inch in length (Step S260).

Having described the invention in the context of example applications, it should be appreciated and understood that the invention is not limited to use with ferrules such as described in U.S. patent application Ser. No. 10/090,880 entitled "OPTICAL FIBER FERRULE," filed Mar. 4, 2002, which is incorporated by reference herein, it may also be used with any large format ferrule that lacks guide grooves or with a large format ferrule where the fiber holes are longer than 3000 microns.

Thus, while we have shown and described various examples employing the invention, it should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments or other combinations of described portions may be available, is not to be considered a disclaimer of those alternate embodiments. It can be appreciated that many of those undescribed embodiments are within the literal scope of the following claims, and others are equivalent.

What is claimed is:

1. A method for insertion of individual fibers of a plurality of fiber cables into respective rows of fiber holes in a ferrule, comprising:

releasably mounting the ferrule in a first element;

releasably mounting a proximal end of a first cable containing exposed fibers onto a movable element;

adjusting the movable element until the fibers are adjacent to a bottom-most row of ferrule fiber holes and inserting each fiber in the first cable into its respective ferrule fiber hole in the bottom-most row;

releasably mounting the inserted first cable in a second element and releasing the inserted first cable from the movable element;

releasably mounting a proximal end of a second cable containing exposed fibers onto the movable element; and adjusting the movable element until the fibers in the second cable are adjacent to a second row of ferrule fiber holes immediately above the bottom-most row and inserting each fiber in the second cable into its respective ferrule fiber hole in the second row.

2. A system for insertion of individual fibers of a plurality of fiber cables into respective rows of fiber holes in a ferrule, comprising:

a first element having a recess formed on a surface therein for releasably retaining the ferrule;

a movable element having a channel formed on a surface therein for releasably retaining a proximal end of a first cable containing exposed fibers, the movable element including at least one micro-positioner for selectively adjusting the movable element relative the first element to align the exposed fibers with a row of ferrule fiber holes and insert each fiber in the first cable into a respective ferrule fiber hole in the row; and a second element fixed relative to the movable element for releasably retaining the first cable after its fibers have been inserted into respective ferrule fiber holes in the row so that the first cable may be released from the movable element following the insertion and a proximal end of a second cable containing exposed fibers may be releasably retained in the movable element for insertion into respective fiber holes in a second row of the ferrule.

3. The system according to claim 2, further comprising:

a light source positioned relative to a distal end of the first fiber cable for shining light through each of the fibers contained within the first fiber cable;

a camera positioned relative the first element for assisting in the alignment of the exposed fibers relative to their respective ferrule fiber holes by generating an image of the exposed fibers as they are being inserted into the ferrule fiber holes.

4. The system according to claim 2, further comprising a camera positioned relative the first element for assisting in the alignment of the exposed fibers relative to their respective ferrule fiber holes by generating an image of the exposed fibers through an access window formed in the ferrule above the exposed fibers.

5. The system according to claim 2, wherein the ferrule includes a large format array of at least three rows of fiber holes.

6. The system according to claim 2, wherein the length of each ferrule fiber hole along its longitudinal axes is less than 3000 microns.

7. A method for inserting optical fibers, constrained in multiple fiber ribbons, into a ferrule defining an inner cavity and having multiple rows of fiber holes extending from an inner face to an outer face, the method comprising:

mounting the ferrule in a ferrule constraining element;

attaching a fiber ribbon to a moveable ribbon holding element, then successively performing
  a) aligning the fibers in the fiber ribbon with a row of fiber holes on the inner face at a location closest to a base wall of the ferrule,
  b) inserting the fibers in the holes by moving the fiber ribbon towards the row until all of the fibers have entered the row and passed from the inner face through the outer face,
  c) detaching a body portion of the fiber ribbon and moving the body portion of the fiber ribbon from the moveable ribbon holding element to a fixed ribbon holding element without withdrawing the fibers from the row, and after performing c), if an additional row of fiber holes remain, attaching a new fiber ribbon to the moveable ribbon holding element and repeating a) through c) with the new fiber ribbon as the fiber ribbon.

8. The method of claim 7 further comprising:

repeating a) through c) with additional fiber ribbons until all of the multiple rows of fiber holes have been filled.

9. The method of claim 8 wherein, once a desired number of fiber ribbons have been inserted into respective rows of the multiple rows, the method further comprises: filling the inner cavity to hold the fiber ribbons within the ferrule.

10. The method of claim 7 further comprising:

angle cutting the fiber ribbon prior to performing b).

11. The method of claim 7 further comprising during b):

shining a light from a light source through the fiber ribbon, and viewing the light from the outer face side of the ferrule using a camera to determine whether individual fibers in the fiber ribbon are aligned with individual respective fiber holes.

* * * * *

UNITED STATES PATENT AND TRADEMARK OFFICE
CERTIFICATE OF CORRECTION

PATENT NO.    : 6,913,397 B2
DATED         : July 5, 2005
INVENTOR(S)   : Keith Kang et al.

It is certified that error appears in the above-identified patent and that said Letters Patent is hereby corrected as shown below:

Column 7,
Line 13, please delete "video camera(s) 780, 781" and insert
-- video camera(s) 780, 782 --.
Line 16, please delete "video monitor 782" and insert -- video monitor 783 --.
Line 29, please delete "video camera 781" and insert -- video camera 782 --.

Column 8,
Line 57, please delete "cameras 781, 782" and insert -- cameras 780, 782 --.

Signed and Sealed this

Thirtieth Day of August, 2005

JON W. DUDAS
*Director of the United States Patent and Trademark Office*